United States Patent [19]
Kroebig

[11] 3,981,155
[45] Sept. 21, 1976

[54] PLASMA DEPOSITED RIDER RINGS FOR HOT DISPLACER

[75] Inventor: Helmut L. Kroebig, Rolling Hills, Calif.

[73] Assignee: The United States of America as represented by the Secretary of the Air Force, Washington, D.C.

[22] Filed: Mar. 10, 1975

[21] Appl. No.: 556,988

[52] U.S. Cl. .................................. 62/6; 29/527.2; 29/156.63; 427/34
[51] Int. Cl.² ............................................ F25B 9/00
[58] Field of Search ............ 62/6; 29/527.2, 156.63; 427/34, 38

[56] References Cited
UNITED STATES PATENTS

| | | |
|---|---|---|
| 3,080,643 | 3/1963 | Hanink et al. .................. 29/527.2 |
| 3,133,341 | 5/1964 | Marien ............................. 29/156.63 |
| 3,205,668 | 9/1965 | Gifford ................................... 62/6 |
| 3,364,675 | 1/1968 | Dorer....................................... 62/6 |
| 3,620,029 | 11/1971 | Longsworth ............................ 62/6 |
| 3,717,004 | 2/1973 | O'Neil..................................... 62/6 |
| 3,802,211 | 4/1974 | Bamberg et al......................... 62/6 |
| 3,938,814 | 2/1976 | Cromwell............................. 427/34 |

Primary Examiner—Lloyd L. King
Attorney, Agent, or Firm—Joseph E. Rusz; Richard J. Killoren

[57] ABSTRACT

A hot cylinder for a cryogenic refrigerator having two plasma spray deposited rider rings of a corrosion and abrasion resistant material provided in the rider ring grooves, wherein the rider rings are machined to the desired diameter and width after deposition. The rider rings have gas flow flats machined on their outer surface.

3 Claims, 5 Drawing Figures

PLASMA DEPOSITED RIDER RINGS FOR HOT DISPLACER

RIGHTS OF THE GOVERNMENT

The invention described herein may be manufactured and used by or for the Government of the United States for all governmental purposes without the payment of any royalty.

BACKGROUND OF THE INVENTION

This invention relates to rider rings for a hot displacer in a cryogenic refrigerator. The primary purpose of the rider rings is to maintain a correct positioning of the piston relative to the cylinder wherein the piston is subjected to dynamic loads or forces from the drive mechanism.

Prior art rider rings are normally located in two grooves in the piston. Concentricity problems exist with the use of these rings due to the interaction between the piston, the cylinder and the rider rings. In miniaturized cryogenic refrigerators, the cylinder wall performs the regenerative function so that precise gap control between the cylinder and the piston is required to obtain maximum regenerator performance. Abrasion of the rider rings will result in increased clearances between the hot cylinder and the piston which will affect the regenerator performance.

Resistance to abrasion of the rider ring is also required since the wear particles will tend to clog the regenerator flow passages in both the hot and the cold regenerators.

In prior art devices wherein the rider rings are normally located in grooves, some means must be provided for placing the rings in the grooves. Split rings or sectionalized rings can be used or the piston may be parted at the groove for the rider rings.

These rings also produce acostic noise when in reciprocating motion.

BRIEF SUMMARY OF THE INVENTION

According to this invention, the rider rings are formed by plasma deposition of a material, which has a high resistance to corrosion and abrasion, in the grooves of the hot piston. After deposition of the material, the rider rings are machined to the final desired dimensions.

IN THE DRAWING

FIG. 5 is a schematic right end view of the device of FIG. 4.

DETAILED DESCRIPTION OF THE INVENTION

Figure 1:
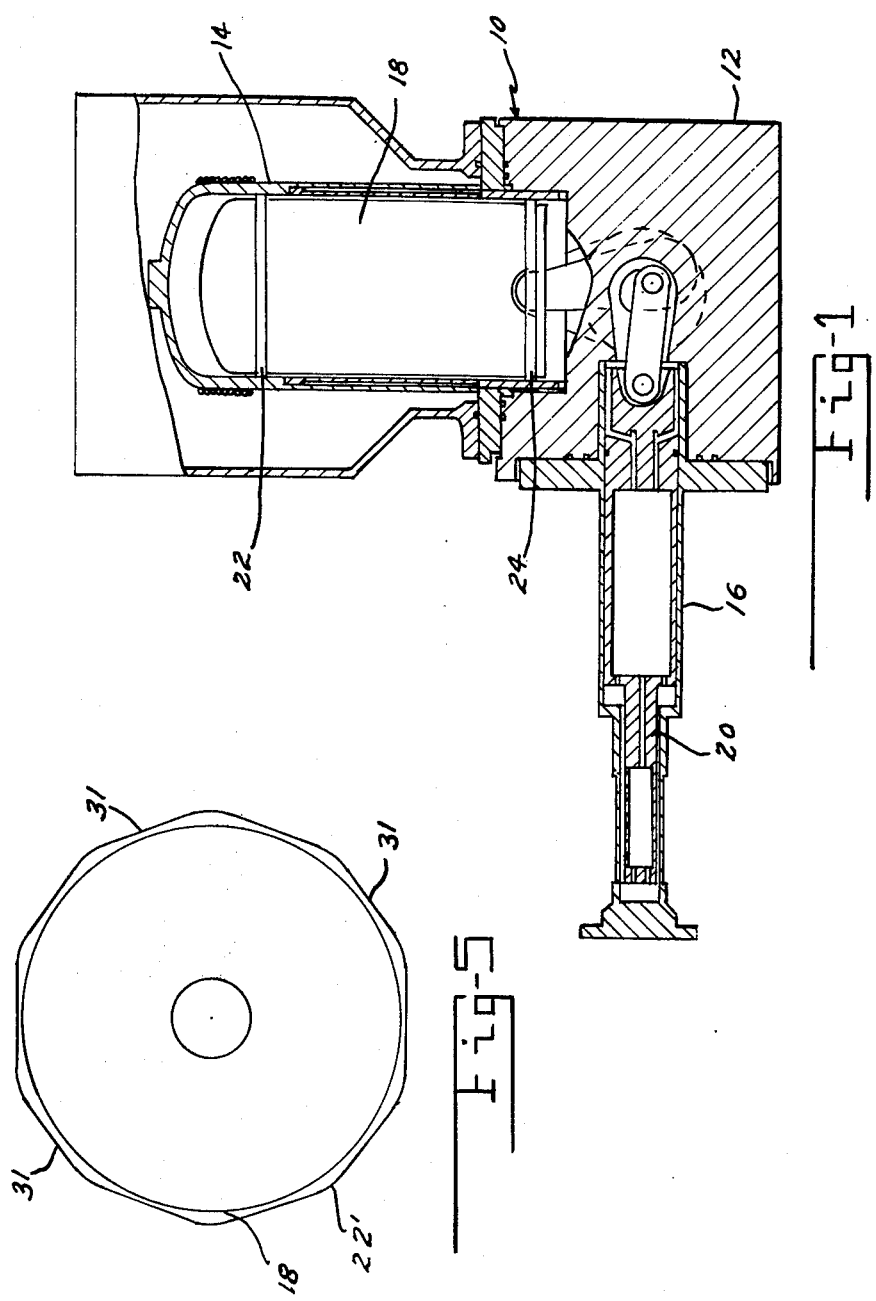
FIG. 1 is a partially schematic illustration showing a conventional cryogenic refrigerator system with which the apparatus of the invention may be used.

Reference is now made to FIG. 1 of the drawing which shows a conventional cryogenic refrigerator 10 having a crankcase 12, a hot cylinder assembly 14 and a cold cylinder assembly 16. The hot and cold displacers 18 and 20 of the hot and cold cylinder assemblies are driven in a conventional manner by a motor, not shown.

Figure 2:
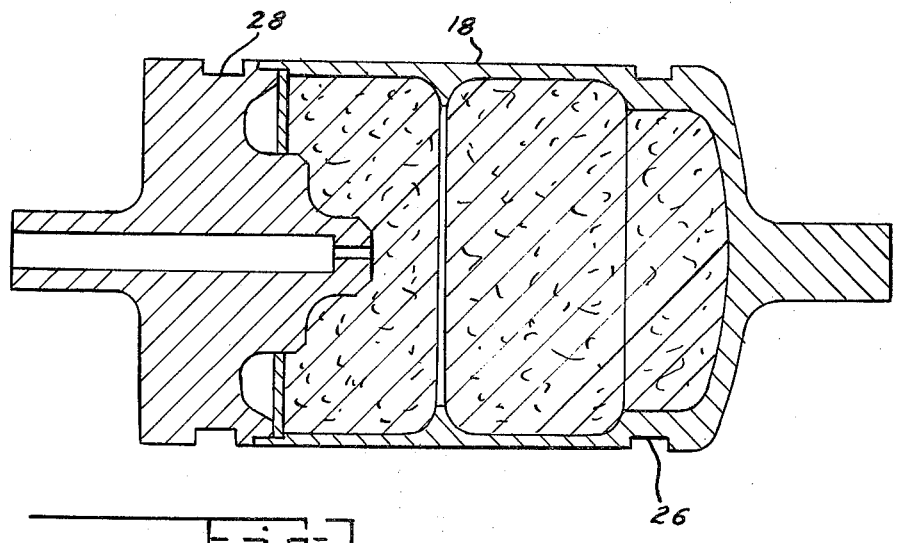
FIG. 2 is a partially schematic cross sectional view of a hot displacer with which the rider rings of the invention are used.
Figure 3:
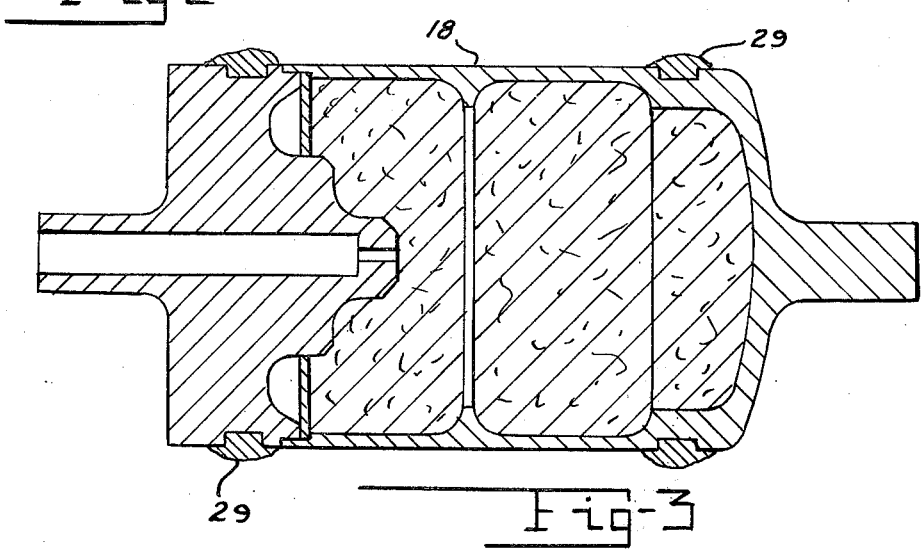
FIG. 3 is a partially schematic cross-sectional view of the device of FIG. 2 after the rider ring material has been plasma deposited.
Figure 4:
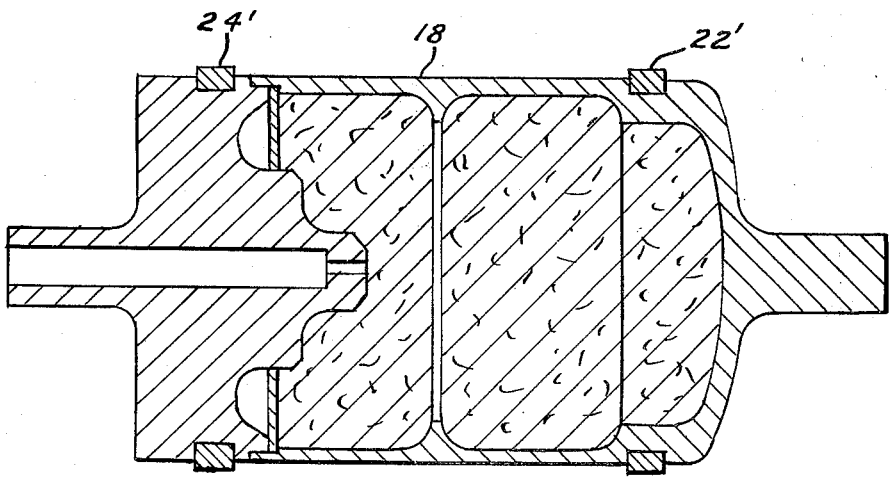
FIG. 4 is a partially schematic cross-sectional view of the device of FIG. 3 after machining.

The hot displacer 18 has a pair of rider rings 22 and 24 which, according to this invention, are provided, as shown in FIGS. 2–4.

As shown in FIG. 2, the hot displacer has grooves 26 and 28 machined therein in a conventional manner. A plasma gun is then used, in a conventional manner, to deposit a corrosion and abrasion resistant material 29 into the grooves 26 and 28. An oversize buildup of material 29 is deposited, to allow for final machining. After the material is deposited, the rider rings 22' and 24' are machined to the desired width and diameter. A great number of plasma spray materials, which may be used, are manufactured by the Linde Corporation and the Colmony Corporation. Examples of these are the metal alloys, Wallex 6 and Wallex 50. The composition of Wallex 6 is as follows;

| | |
|---|---|
| Co | 55% min. |
| Cr | 29% |
| W | 4.5% |
| Si | 1.25% |
| C | 1.00% |
| Other materials | 6.5% max |

The Rockwell hardness of Wallex 6 is 39–44 RC and the melting point is 2325°F.

After the rings are machined to the desired width and diameter, flat surfaces 31, as shown in FIG. 5, are machined onto the rider rings to allow for gas to pass along the hot displacer wall.

There is thus provided a hot displacer for a cryogenic refrigerator with rider rings which are resistant to abrasion and corrosion.

I claim:

1. In combination with a hot displacer, for a cryogenic refrigerator, having a first rider ring groove near the top of the displacer and a second groove near the bottom of the displacer, a plasma spray deposited rider ring in each of said grooves, of a corrosion and abrasion resistant material, which has been machined to the desired width and diameter after deposition; said rider rings having a plurality of flat surfaces machined on the outer surface for permitting gas to pass along the hot displacer wall.

2. The device as recited in claim 1 wherein the corrosion and abrasion resistant material is an alloy having 55 percent min. Co, 29 percent Cr, 4.5 percent W, 1.25 percent Si, 1.00 percent C and a maximum of 6.5 percent other materials.

3. The method of providing rider rings for a cryogenic-refrigerator hot displacer having a pair of rider ring grooves in the outer surface, comprising: plasma spray depositing a corrosion and abrasion resistant metal alloy into said grooves; allowing the alloy material to build up to a width and diameter greater than the desired width and diameter of the finished rider rings; machining the rider rings to the desired diameter and width; machining a plurality of gas flow flat surfaces on the rider rings.

* * * * *